Figure 2:
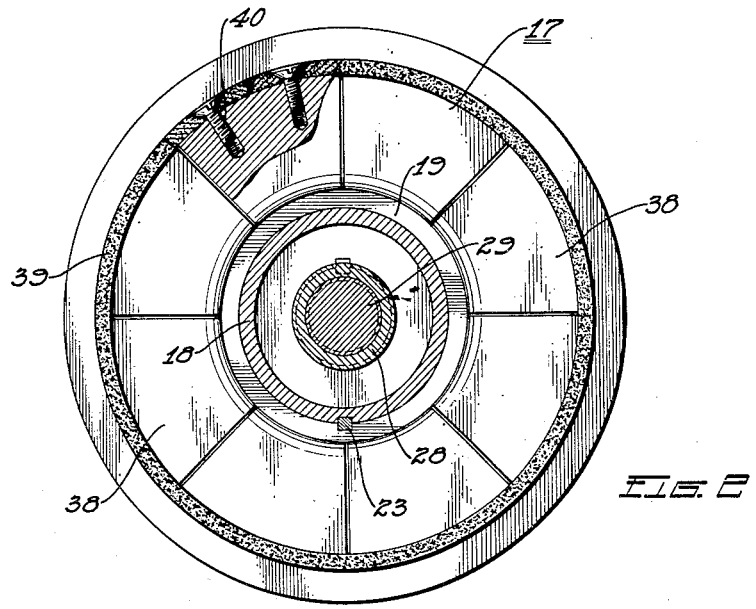

June 27, 1933.        J. G. VINCENT        1,916,084
INTERNAL COMBUSTION ENGINE
Original Filed Dec. 27, 1927

Inventor
JESSE G. VINCENT
By Milton Tibbetts
Attorney

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed December 27, 1927, Serial No. 242,953. Renewed July 15, 1932.

This invention relates to internal combustion engines and particularly to the controlling of torsional vibration in the shafts of such engines.

It has for one of its objects to provide a simple and effective method for controlling such vibration.

Another object of the invention is to provide a device operable to damp the vibration occurring at some of the critical speeds of the shaft, and operable to avoid the vibration at other critical speeds by changing the vibratory characteristics of the shaft.

Another object of the invention is to provide a device which will change the mass of the shaft system at a predetermined shaft speed.

Another object of the invention is to provide an expansible damping device in which the damping friction shall be increased with shaft speed.

Another object of the invention is to provide a device which shall increase the damping effect with shaft speed up to a predetermined speed, and shall not operate as a damper above that speed.

A further object of the invention is to provide a simple, inexpensive and effective form of vibration damper which shall be self-contained and readily accessible, and in which the damping effect may be varied upon assembly of the damper.

Figure 1:
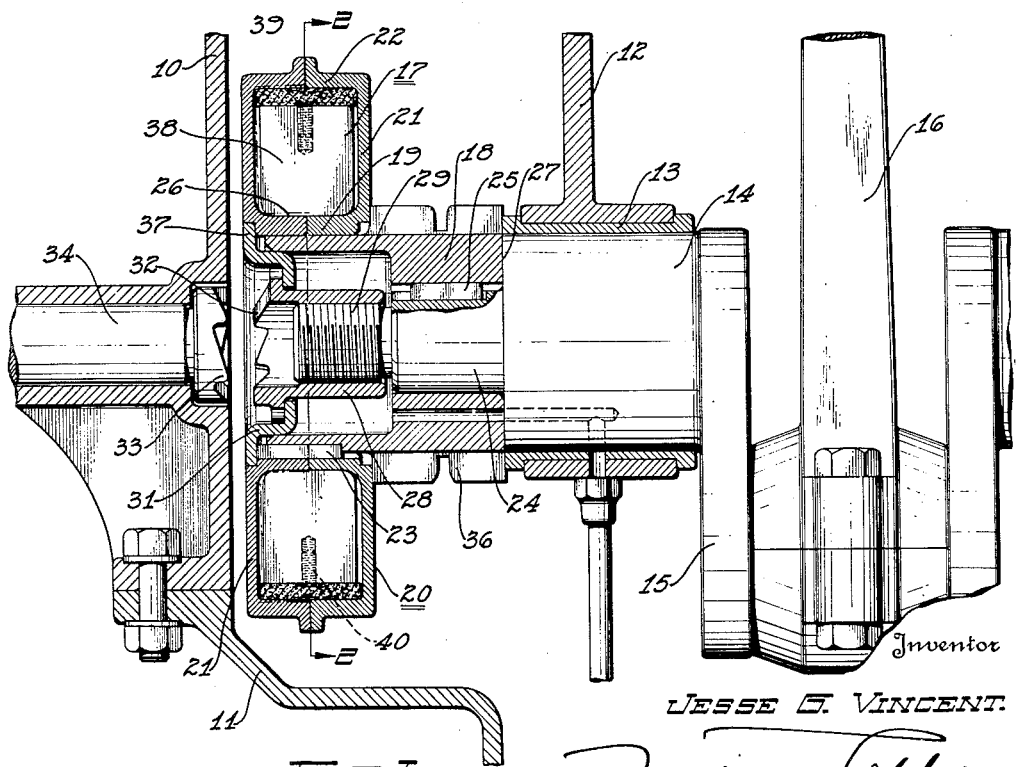

Other objects of the invention will appear from the following description taken in connection with the drawing, which forms a part of this specification, and in which:

Fig. 1 is a vertical, longitudinal section through a portion of an internal combustion engine having a vibration damper constructed in accordance with this invention, and Fig. 2 is a front elevation of the damper shown in Fig. 1, partially broken away and partially in section substantially on the line 2—2 of Fig. 1.

The crank shaft and associated flywheel of an internal combustion engine constitute a torsionally elastic system which, like all similar systems, will vibrate when any applied torque is in synchronism with its natural frequency. At certain speeds of the shaft, called critical speeds, its natural period is equal to the period of the impressed torque, or some harmonic component thereof, so that this force will continuously add energy to the motion of the shaft. Thus a condition of resonance is produced and torsional vibration of greater or less severity is the result.

Various forms of means have heretofore been proposed for the control of such vibrations, which depend upon damping, or the dissipation from the vibrating system of sufficient energy to prevent the resonant growth of the disturbance. Such devices usually operate by friction between an inertia or weight member and the vibrating system. In some cases, however, it has been found difficult to provide such means adapted to damp all of the vibratory periods within the engine range, the more especially since these occur at widely separated speeds and with considerably different intensities. Ordinarily the vibrations occurring at the lower shaft speeds require the dissipation of less energy than those occurring at the higher speeds.

The present invention contemplates a device in which the vibration at some of the periods is controlled by damping and the vibration at other periods is avoided. Such avoidance is effected by so changing the characteristics of the system as to shift the position in the speed range at which a given vibration occurs to some point other than the instantaneous speed of the shaft. This result is secured by providing an inertia mass capable of rotation independently of the shaft and having a friction connection therewith, and so arranging this mass as to move in response to centrifugal force to increase the friction between the mass and the rotating shaft. By reason of this arrangement a certain speed of the shaft is reached at which the friction is greater than the forces of the vibration and is sufficient to lock the inertia mass to the shaft so that it becomes a flywheel rotatable therewith. This addition of mass to the shaft system changes the vibratory characteristics of the shaft, as is well known in the art to which this invention relates, the particular effect being to lower the position of the critical speeds in the speed range. In this way the position of a given critical speed can be shifted to a point below the instantaneous shaft speed, so that no disturbance takes place.

Referring to the drawing, 10 represents the crank case of an internal combustion engine having a removable lower cover or oil pan 11 and provided with transverse webs 12. These webs support suitable aligned bearings 13 for an engine crank shaft 14, which has the usual integral cranks 15, each of which is connected by a connecting rod 16 to a piston mounted in one of the engine cylinders, the piston and cylinders not being shown in the drawing but being of usual construction.

The damping means of this invention is illustrated in Fig. 1 as mounted at or adjacent the end of the crank shaft 14. It is in the form of a sectional inertia member 17 which is mounted coaxially with the crankshaft and upon a suitable bearing part thereof. As shown, this bearing part is a shaft member 18 on which is mounted the hub 19 of a housing member or friction drum 20. This is in the form of a hollow annulus having web portions 21 and an axially disposed flange portion 22, and is preferably in two sections as shown to permit assembly, both sections being rotatively secured to the member 18 by a key 23. The shaft member 18 is also keyed to the reduced end 24 of the crank shaft as indicated at 25. The housing hub 19 has a bearing portion 26 on which the inertia member 17 is adapted to fit for rotative movement. One end of the member 18 preferably abuts a shoulder 27 formed by reducing the end of the shaft, and it is retained in axial position on the shaft by a nut 28 on the threaded end 29 of the crank shaft. This nut operates through a dished washer 31 against the outer section of the housing 20 so that the housing is rigidly secured to the crank shaft to rotate therewith. The inertia member, however, is free to turn on the bearing portion 26 except as hereinafter described. The end of the nut 26 is preferably formed with clutch teeth 32 which may be engaged with similar teeth 33 on an endwise movable starter shaft 34. This is the usual hand starting crank for manually rotating the crank shaft for starting.

The inertia member is positioned axially on the member 19 between the web portions 21, the sections or halves of the housing 20 being clamped between a gear or chain sprocket 36 and a radially disposed flange 37 on the washer 31. The gear or sprocket 36 may be formed integrally with the shaft member 18 and used for driving the engine cam-shaft and other engine accessories (not shown).

The inertia member 17 is in the form of an annulus or ring, composed of a plurality of segmental weight members 38 of substantially equal mass. Each of these members bears at its inner surface on the bearing portion 26 and is connected at its outer end to suitable retaining means, by which the segments or weight members are kept in proper position. In the form of device illustrated in the drawing, the retaining means consists of a strip or band 39 of any suitable friction material, which is secured to the outer surface of each of the weight members 38 in any convenient way as by the screws 40, the heads of which are countersunk into the band 39. The friction member 39 is thus adapted to connect and space the members 38, and to retain them in proper position. This member is also designed to frictionally engage the flange position 22 of the housing 20 so as to retard and resist relative movement between the inertia member and the crank shaft to which the housing is attached. It is to be understood, however, that other suitable retaining means may be used to connect the weight members and that such connecting means need not engage the flange 22, but that the outer ends of the members 38 may bear directly on this flange 22.

The size of the parts is such that there is a light frictional contact between the member 39 and its cooperating surface on the flange 22, which is sufficient to start the inertia member rotating when the engine starts. The contact pressure increases as the speed increases by reason of the centrifugal force acting on the weight members 38, which move radially outward a slight amount, there being sufficient stretch and slack in the member 39 to permit this. Thus there is an increase in the effective diameter of the damper, and it expands, to produce a braking effect which resists forces tending to move the inertia member relatively to the housing, and retards any such relative movement. As is well understood, torsional vibration in the shaft tends to cause a rapid, alternating relative movement between the housing 20 which is fixed to the shaft, and the inertia member 17, and this frictional resistance is therefore well adapted to dissipate the energy of the vibrations, particularly in the lower part of the crank shaft speed range, where vibrations are usually not as strong as those which occur in the upper part of the speed range. The centrifugal force, and of course the friction, increases with increasing speed, which results in greater damping effect for the increased vibratory energy at the higher speeds. Thus it will be apparent that the invention provides a device in which the damping effect is increased in accordance with the speed by reason of the centrifugal action of the weight members carried by the damper.

As the speed of shaft rotation further increases, the centrifugal force acting on the segmental weight members 38 also increases, so that the friction will eventually become sufficient to lock the inertia member to the housing 20. The point at which such locking occurs depends on the number and weight of the members 38, and on the coefficient of friction of the band or retaining member 39, which factors may be varied in the design of the device to secure frictional locking at any predetermined speed.

As soon as the inertia member is thus frictionally locked to the housing 20, it is connected to the shaft 14 and forms therewith a new vibratory system having different characteristics from those of the previous system. In general, the result of adding mass to a vibratory system is to lower the critical speeds of the new system. Thus in the present instance the critical speeds of the shaft system comprising the shaft, flywheel, and locked damper, are considerably lower than the corresponding critical speeds of the system when the damper is permitted to rotate with respect to the shaft. If the locking is arranged to take effect just before a given critical speed is reached, this critical speed may be shifted to a point in the engine speed range below the instantaneous shaft speed, thus entirely avoiding the disturbance.

For example, in an automobile engine having critical speeds occurring at 1300, 1600, 2400 and 3200 R. P. M., corresponding to vehicle speeds of 26, 32, 48 and 64 miles per hour, the locking could be arranged to occur at 3000 R. P. M., corresponding to a speed of 60 miles per hour, which would transfer the critical speed of the resulting system to some lower point such as 2500 R. P. M., corresponding to 50 miles per hour. As the instantaneous engine speed is already 3000 R. P. M., which is considerably above the new critical speed of 2500 R. P. M., the vehicle can be driven up through 64 miles per hour without any further disturbance from torsional vibration. The reverse action occurs upon decreasing speed, the inertia member being released at 60 miles per hour whereupon the critical speed is shifted from 2500 to 3200 R. P. M. The vibrations occurring at the lower speeds mentioned are controlled by frictional damping between the inertia member 17 and the housing member 20, as previously explained.

It will be evident that if the inertia member were composed of a single solid annulus, the increase in the friction with increase in speed would be nil, because such a member would be incapable of expanding in response to centrifugal force. This centrifugal effect increases within rational limits with the number of segments into which the inertia member is divided. The device thus provides a form of vibration damper in which the proportion of damping friction to flywheel effect may be determined during the manufacture of the damper to suit any particular conditions, simply by changing the number of segments 38.

The inertia member is conveniently provided by forming a ring or annulus of any suitable material such as iron or bronze, then fastening to its periphery the retaining strip of friction material 39, and subsequently sawing the ring into the segments 38 on radial lines. The center of gravity of each of the weight members 38 is spaced from the axis of rotation, but since these weight members are of equal mass and are symmetrically disposed about the axis of rotation, the damper is in static balance about the shaft axis.

The inertia member 17 may be provided, if desired, with sound deadening strips or spacers of any suitable material located in the slots or spaces between the segmental weight members 38. This construction has not been illustrated in the drawing, but its applicability will be readily appreciated as a means for preventing noise from the striking together of adjacent segments 38.

The invention thus provides a method of controlling torsional vibrations in shaft systems having vibration periods at different critical speeds, by which the vibration at some of the speeds are controlled by friction damping in accordance with the speed, and the vibrations at a higher speed are avoided by shifting the critical speed to a point removed from the instantaneous shaft speed.

The invention also provides an improved form of damping means capable of readily and effectively damping torsional vibration, and expansible in response to increased speed to vary the damping effect up to a predetermined speed.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What is claimed and desired to be secured by Letters Patent is:

1. A vibration damper for shafts comprising a housing mounted to rotate with the shaft, and an inertia element in said housing having segmental weight members and a friction member secured to said weight members and frictionally engaging said housing.

2. A vibration damper for shafts comprising a housing mounted to rotate with the shaft, a plurality of weight members forming an annular inertia member rotatable with respect to said housing, and a friction member encircling said inertia member and secured to each of said members, said friction member engaging the housing to oppose movement of the inertia member with respect to said housing.

3. A vibration damper for shafts comprising an annular housing secured to the shaft, segmental weight members in said housing forming an inertia member rotatable with respect to said housing, each of said weight members being radially movable in response to centrifugal force, and a flexible member peripherally surrounding the inertia member and secured to said weight members, said flexible member cooperating with the housing to frictionally retard rotation of the inertia member relative to the shaft.

4. A vibration damper for shafts comprising a plurality of weight members forming an inertia member rotatable with respect to the shaft, a member secured to said shaft, and retaining means for said weight members engaging said shaft member to frictionally retard relative motion therebetween.

5. A vibration damper for shafts comprising a member secured to the shaft, an expansible inertia member having a plurality of weight members responsive to shaft speed, and friction means surrounding said weight members and connecting the latter together, said friction means engaging the housing to develop friction between the inertia member and the shaft member.

6. A vibration damper for shafts comprising segmental weight members forming an expansible inertia member, flexible means surrounding the inertia member to retain the weight members in juxtaposition, and means on the shaft frictionally engaging the flexible means upon expansion of the inertia member.

7. A vibration damper for shafts comprising a housing keyed to the shaft and forming an annular chamber concentric therewith, segmental weight members forming a sectional annular inertia member mounted to rotate in said housing, and a band of flexible friction material surrounding the periphery of the inertia member and secured to each of said weight members, said band frictionally engaging the housing to retard relative rotation with the inertia member.

8. In a vibration damper for shafts, the combination with a device mounted for rotation with the shaft, of a weight member mounted for rotation with respect to the shaft, and friction means interposed between said device and said weight member for resisting relative rotation thereof, said weight member being responsive to centrifugal force to alter the resistance to said relative rotation on change in rotative speed of the shaft, such that said weight member and device will be locked for rotation together when a predetermined shaft speed within the normal range of shaft speeds is reached.

9. In a vibration damper for shafts, the combination with a device mounted for rotation with the shaft, of inertia means mounted for rotation with respect to the shaft, and friction means interposed between said device and said inertia means for resisting relative rotation thereof, said inertia means being expansible in response to centrifugal force to alter the resistance to said relative rotation on change in rotative speed of the shaft, such that said inertia means and device will be locked for rotation together when a critical shaft speed is approached.

10. In a vibration damper for shafts, the combination with a device mounted for rotation with the shaft, of a weight member mounted for rotation with respect to the shaft, and a friction band interposed between said device and said weight member for resisting relative rotation thereof, said weight member being responsive to centrifugal force to alter the resistance to said relative rotation on change in rotative speed of the shaft, such that said weight member and device will be locked for rotation together when a predetermined shaft speed within the normal range of shaft speeds is reached.

11. In a vibration damper for shafts, the combination with a device having a substantially annular portion mounted for rotation with the shaft, of a plurality of weight members supported for free movement with respect to the shaft within the annular portion of said device, said members being urged outwardly in response to centrifugal force, and deformable friction means surrounding said weight members between said weight members and said device for frictionally resisting relative movement thereof.

12. A vibration damper for shafts comprising a member secured to the shaft, an expansible inertia member having a plurality of weight members responsive to shaft speed, and deformable friction means surrounding said inertia member between the latter and the shaft member for resisting relative rotation thereof.

13. A vibration damper for shafts comprising a drum member secured to the shaft, a plurality of weight members supported within said drum for outward movement in response to centrifugal force, and friction means formed of friction developing material interposed between said weight members and said drum and frictionally engaging said drum member for resisting relative rotation of said members.

14. A vibration damper for shafts comprising a drum member secured to the shaft, a plurality of weight members supported within said drum member for outward movement in response to centrifugal force, and a continuous annular friction element interposed between the weights and the drum member for retaining said weight members in operative position in said drum member, said element engaging said drum member for resisting relative rotation of said members.

15. In a vibration damper for crankshafts of internal combustion engines, the combination with a shaft member supported for rotation with the shaft, of a weight member supported for oscillatory movement with respect to the shaft, and a distinct friction means interposed between said shaft member and said weight member for resisting relative oscillatory movement of the latter, said weight member being responsive to centrifugal force to alter the resistance to said relative rotation on change in rotative speed of the shaft, the nature of said friction means being such that when the shaft reaches a speed of rotation corresponding to a natural fundamental torsional period of vibration thereof, the friction developed by said friction means will be sufficient to lock the weight member and the shaft member for rotation together.

16. A vibration damper for crankshafts having a natural fundamental torsional period of vibration at a certain speed of rotation, comprising a shaft member supported for rotation with the shaft, an expansible inertia member having a plurality of weight members supported for oscillatory movement with respect to the shaft in response to torsional vibrations thereof and for outward movement toward said shaft member in response to increase in shaft speed, and deformable friction means interposed between the inertia member and the shaft member for developing friction in response to relative oscillatory movement thereof at crankshaft speeds less than the said certain speed of rotation, the nature of said deformable friction means being such that upon the approach to said certain speed the friction developed by said means is increased to an extent sufficient to prevent relative oscillatory movement of said shaft and inertia members.

In testimony whereof I affix my signature.

JESSE G. VINCENT.